US012661289B2

(12) United States Patent
Hansen et al.

(10) Patent No.: US 12,661,289 B2
(45) Date of Patent: Jun. 23, 2026

(54) PORTABLE PATIENT LIFT

(71) Applicant: United States Government as Represented by the Department of Veterans Affairs, Washington, DC (US)

(72) Inventors: Andrew Hansen, Apple Valley, MN (US); Steve M. Morin, Minneapolis, MN (US); Ashley Crooks, St. Cloud, MN (US); Alexandra S. Bornstein, Minneapolis, MN (US); Eric Nickel, Minneapolis, MN (US)

(73) Assignee: THE UNITED STATES GOVERNMENT AS REPRESENTED BY THE DEPARTMENT OF VETERANS AFFAIRS, Washington, DC (US)

( * ) Notice: Subject to any disclaimer, the term of this patent is extended or adjusted under 35 U.S.C. 154(b) by 162 days.

(21) Appl. No.: 18/493,164

(22) Filed: Oct. 24, 2023

(65) Prior Publication Data

US 2024/0130911 A1 Apr. 25, 2024
US 2024/0225933 A9 Jul. 11, 2024

Related U.S. Application Data

(60) Provisional application No. 63/418,822, filed on Oct. 24, 2022.

(51) Int. Cl.
*A61G 7/10* (2006.01)

(52) U.S. Cl.
CPC ......... *A61G 7/1015* (2013.01); *A61G 7/1046* (2013.01); *A61G 7/108* (2013.01)

(58) Field of Classification Search
CPC ................ A61G 7/1051; A61G 7/1046; A61G 2200/34; A61G 7/1019; A61G 7/1061; A61G 7/1067; A61G 7/1015; A61G 7/108; A61G 7/1017; A61G 7/1042; A61G 7/1055; A61G 5/14; A61G 7/1096; A61G 2200/36; A61H 3/04; A61H 3/008; A61H 1/0262; Y10S 297/10; Y10S 180/907; A63B 21/00181
USPC ........................................... 5/83.1, 87.1, 600
See application file for complete search history.

(56) References Cited

U.S. PATENT DOCUMENTS 1,878,785 A * 9/1932 Leavitt ................. A61G 7/1015 5/310
4,117,561 A * 10/1978 Zamotin .............. A61G 7/1042 5/83.1
5,333,333 A * 8/1994 Mah ......................... A61H 3/04 280/30
2005/0283906 A1* 12/2005 Summers ............. A61G 7/1015 5/86.1

(Continued)

FOREIGN PATENT DOCUMENTS

GB 2433925 A * 7/2007 ........... A61G 7/1017

*Primary Examiner* — Madison Matthews
(74) *Attorney, Agent, or Firm* — Ballard Spahr LLP

(57) ABSTRACT

An apparatus for lifting and moving a patient including a cart assembly with at least one drive wheel assembly secured thereto, a carriage assembly that is rotatably secured to the cart assembly, the carriage assembly including a lift assembly with a support arm, a patient support device operably secured to the support arm, and a counterweight assembly, the counterweight being movable along a longitudinal axis of the carriage assembly.

19 Claims, 12 Drawing Sheets

(56) References Cited

U.S. PATENT DOCUMENTS

| | | | | |
|---|---|---|---|---|
| 2013/0061392 | A1 * | 3/2013 | Zerhusen ............. | A61G 7/1074<br>5/81.1 R |
| 2020/0163819 | A1 * | 5/2020 | Cheek .................. | A61G 7/1051 |

* cited by examiner

PORTABLE PATIENT LIFT

CROSS-REFERENCE TO RELATED APPLICATION

This application claims priority to and the benefit of the filing date of U.S. Provisional Patent Application No. 68/418,822, filed Oct. 24, 2022, the entire disclosure of which is incorporated by reference herein.

FIELD

This application relates to devices, systems, and methods of use thereof for lifting and moving a patient.

BACKGROUND

Commonly used hospital beds typically have openings along the bottoms of the bedframes that permit commercially available powered patient lifts to be correctly positioned for lifting and transferring patients. In some environments, commercially available powered patient lifts are incapable of being positioned such that they can easily access the patient. For example, in some hospital settings, specially designed platform beds that lack any openings along the bottom of the bedframe are used due to specific patient needs. As such, the stabilizing legs that extend along the floor underneath the supported patient may not be positioned as desired. In other instances, the environmental challenges prevent the use of mobile patient lifts or conventional ceiling lifts. Considering these barriers, patients with specific needs, including mobility and bariatric issues, may not receive the best available treatment due to the inability to access specific clinical settings.

Additionally, staff may be put at risk where conditions limit the usage of a powered lift when assisting a patient. If a patient's condition dictates the use of a lift for executing transfers, and no lift is available that can be correctly positioned in the clinical setting, the staff are forced to perform manual patient handling. As would be expected, the manual lift and transport of patients puts both the patients and staff at increased risk of injury from mishaps, leading to potential lost man-hours and further conditions of understaffing.

SUMMARY

Disclosed herein, in one aspect, is an apparatus for lifting and moving a patient. Various embodiments of the apparatus may include a cart assembly with a frame and at least one drive wheel assembly secured to the frame so that the apparatus may be readily moved. Preferably, a carriage assembly is rotatably secured to the cart assembly about a vertical axis. The carriage assembly may include a lift assembly with a support arm having a proximal end secured to a front end of the frame of the carriage assembly. A patient support device such as, but not limited to, a flexible sling is operably secured to a distal end of the support arm and is configured to receive a patient therein. A counterweight assembly includes a plurality of counterweights supported on the carriage assembly. The plurality of counterweights are selectively movable (optionally, independently movable) along a longitudinal axis of the carriage assembly and configured to offset the leverage caused by the positioning of the patient in the patient support device. The counterweights can be moved away from the supported patient as necessary to help maintain the stability of the apparatus.

An alternate embodiment of an apparatus for lifting and moving a patient may include a cart assembly including a frame, at least one wheel assembly secured to the frame, and a lift assembly with a support arm that is operably secured to the cart. The lift assembly includes a patient support device that is operably secured to the support arm, and a counterweight assembly including a plurality of counterweights. Preferably, the plurality of counterweights are selectively movable (optionally, independently movable) along a longitudinal axis with respect to the cart assembly to balance out the leverage caused by the weight of the patient as the patient is lifted.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

These and other features of the preferred embodiment of the invention will become more apparent in the detailed description in which reference is made to the appended drawings, wherein.

Figure 1A:
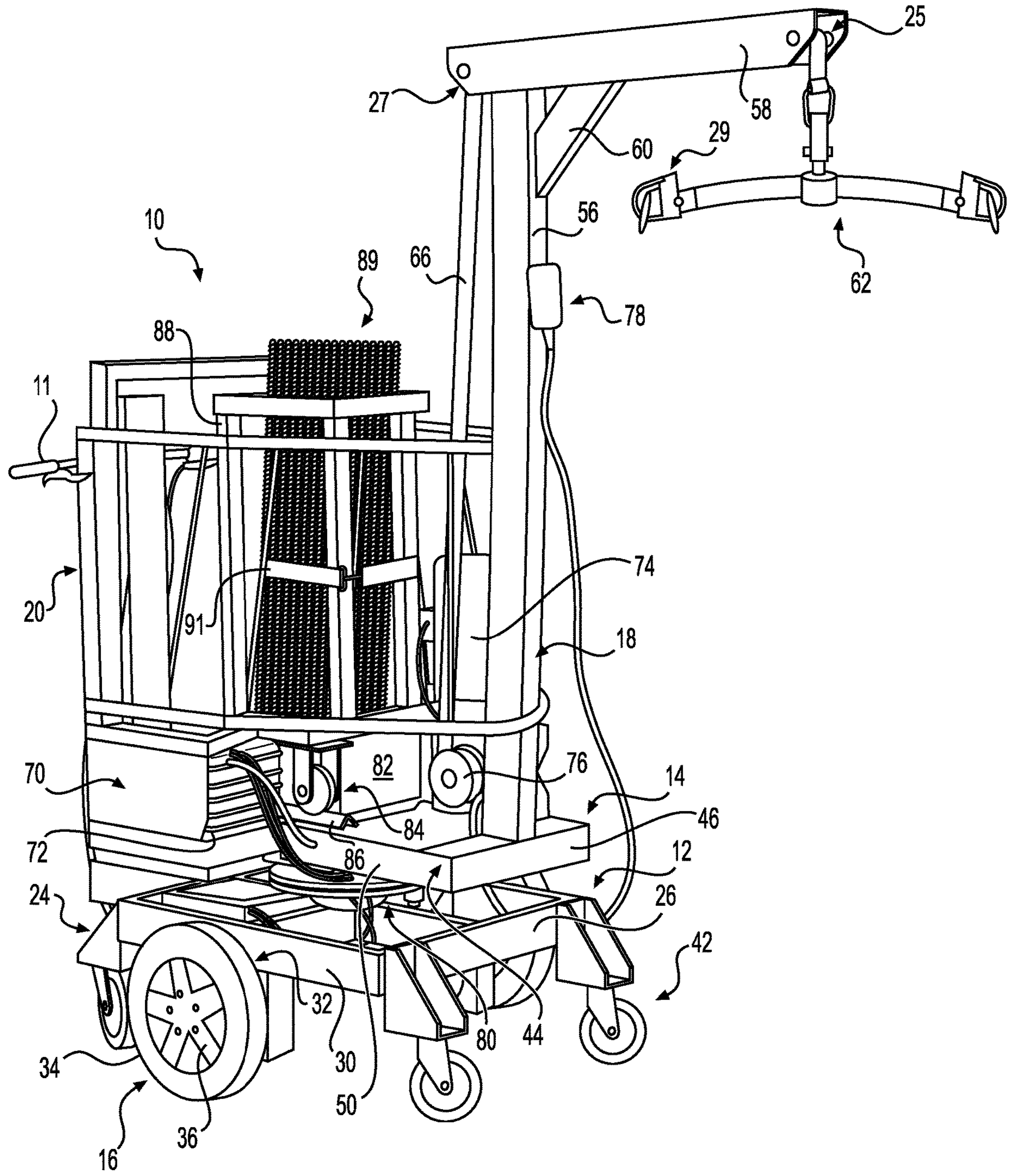
FIGS. 1A and 1B are front and rear perspective views, respectively, of a portable apparatus for lifting and moving a patient in accordance with an embodiment of the present disclosure.

It should be understood that the drawings provided herein are not necessarily to scale. Rather, the drawings are formatted to help aid the understanding of certain features disclosed herein. For example, the relative sizes of the depicted tufts and backing materials shown in the figures are not necessarily indicative of what would be seen in the tufted articles disclosed herein.

DETAILED DESCRIPTION

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present invention which will be limited only by the appended claims.

It must be noted that as used herein and in the appended claims, the singular forms "a," "an," and "the" can optionally include plural references unless the context clearly dictates otherwise. Thus, for example, reference to "a wheel" can represent disclosure of embodiments in which a single such wheel is provided, and unless the context dictates otherwise, can also represent disclosure of embodiments in which a plurality of such wheels are provided.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about," "substantially," or "generally," it is contemplated that values within up to 15%, up to 10%, up to 5%, or up to 1% (above or below) of the particularly stated value or characteristic can be included within the scope of those aspects.

The word "or" as used herein means any one member of a particular list. However, it is understood that when the word "or" is used herein within a list of multiple members, the disclosure is intended to provide support for embodiments in which any combination of members of that list is provided.

Figure 1B:
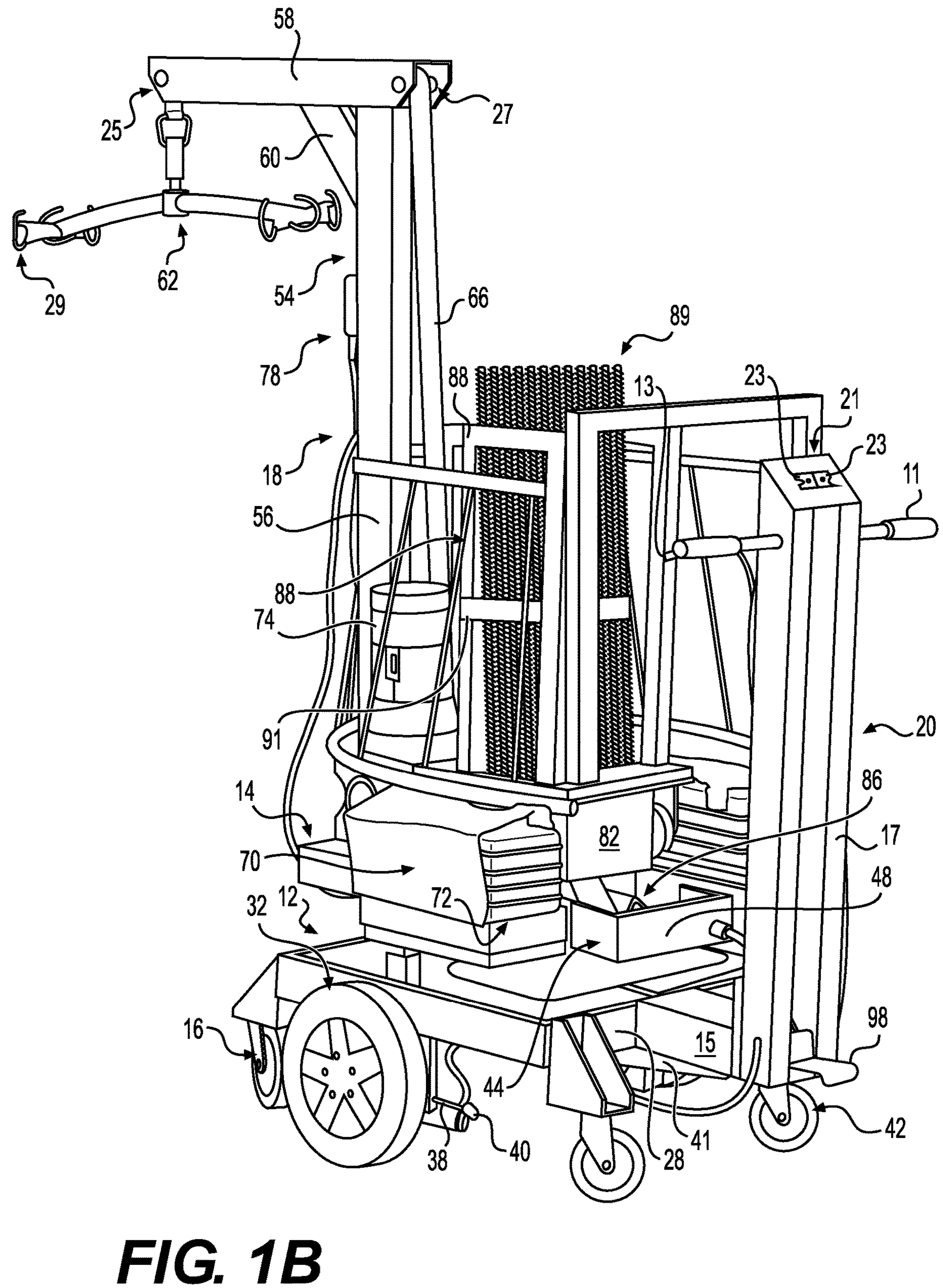

Referring now to FIGS. 1A and 1B, a portable patient lift apparatus 10 in accordance with an embodiment of the present disclosure is shown. Preferably, the portable patient lift apparatus 10 includes a cart assembly 12, a carriage assembly 14 that is rotatably mounted to the cart assembly 12, a lift assembly 18 that is configured to raise and lower a patient, and a counterweight assembly 22 that is configured to counterbalance the weight of a patient that is being supported by the lift assembly 18. As shown, the cart assembly 12 can include a substantially rectangular frame 24 that is formed by a front member 26, a rear member 28, and a pair of side members 30 extending therebetween. Drive wheel assemblies 16 can be mounted to the frame 24 and be configured to provide a powered motive force for the patient lift apparatus 10. Each drive wheel assembly can include a wheel 32, which can optionally have a pneumatic tire 34 disposed on a driven hub 36, an electric drive motor 38, and an engagement switch 40. Each drive wheel assembly 16 can be mounted to a corresponding side member 30 of the frame 24 of the cart assembly 12. Although the present embodiment is depicted with two drive wheel assemblies 16, one per side of the cart assembly, in alternate embodiments fewer or more drive wheel assemblies 16 may be utilized. For example, in one alternate embodiment, each side of the cart assembly 12 can be provided with front and rear drive wheel assemblies 16. Because the depicted embodiment only includes two drive wheel assemblies 16, two pairs of casters 40 are mounted to the frame 24 of the cart assembly 12 to maintain balance, one pair being mounted to the front member 26 and the second pair being mounted to the rear member 28. As noted above, each drive wheel assembly 16 can include an engagement switch 40. The engagement switch 40 allows a user to disengage the wheel 32 of the corresponding drive wheel assembly 16 from the drive motor 38 should the drive motor become disabled. With the wheels 32 disengaged from the corresponding drive motors 38, the user is free to maneuver the cart as necessary as the wheels 32 are free to rotate independently of the drive motors 38.

As best seen in FIG. 1B, the cart assembly 12 can also include a handle assembly 20 that is mounted to the rear member 28 of the frame 24. The handle assembly 20 can include a horizontal member 15 and a vertical member 17 that extends upwardly therefrom to a height that is convenient for grasping by the user. A pair of hand grips 11 can be provided at the distal end of the vertical member 17. As shown, each hand grip 11 can include a trigger portion 13 that allows the user to activate the drive motor 38 of the corresponding drive wheel assembly 16 by pulling the corresponding trigger 13 toward the hand grip 11. A switch panel 21 can also be provided between the hand grips 11 and can include a switch 23 for each of the drive wheel assemblies 16. Each switch 23 can allow the user to select the direction in which the corresponding drive wheel assembly 16 will move the patient lift apparatus 10 when the corresponding trigger 13 is depressed. Specifically, each switch 23 can allow the user to select forward, neutral, or reverse for each drive wheel assembly 16. Typically, both switches 23 will be selected to drive the lift apparatus 10 the same direction, such as forward. However, should a user desire to rotate the patient lift apparatus 10 about its vertical axis, the user may select the forward direction for one switch 23 and the rearward direction for the other switch 23. For example, should the user want to rotate the lift apparatus 10 in the counter-clockwise direction, the user can set the switches 23 to forward for the right side drive wheel assembly 16 and rearward for the left side drive wheel assembly 16. As such, a counter-clockwise rotation of the patient lift apparatus 10 occurs when both triggers 13 are depressed. A clockwise rotation can be effected by the reverse positioning of the switches 23.

Figure 2A:
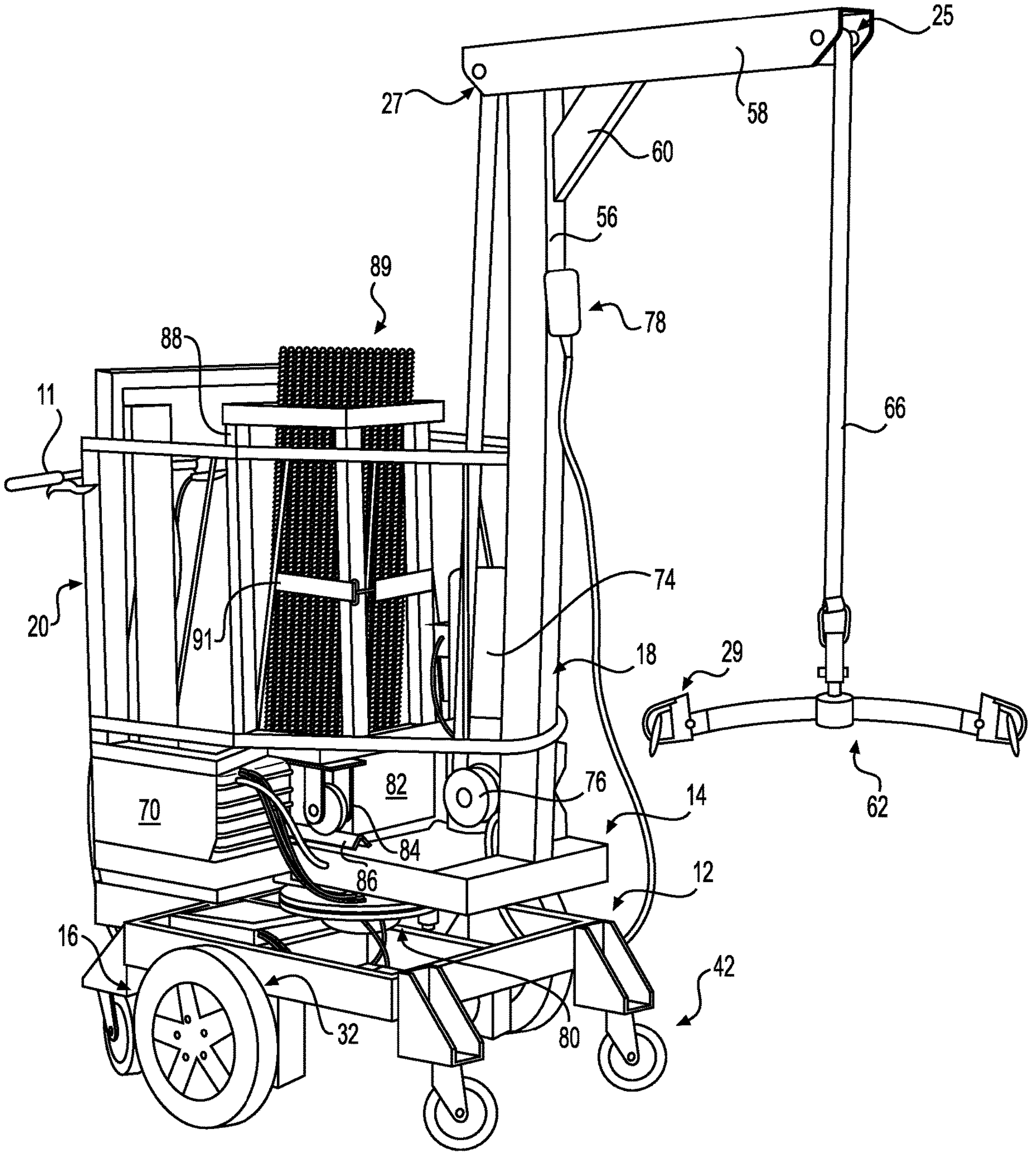
FIGS. 2A and 2B are front perspective views of the apparatus shown in FIGS. 1A and 1B with the lift bar of the lift assembly in a lowered position and a raised position, respectively.
Figure 2B:
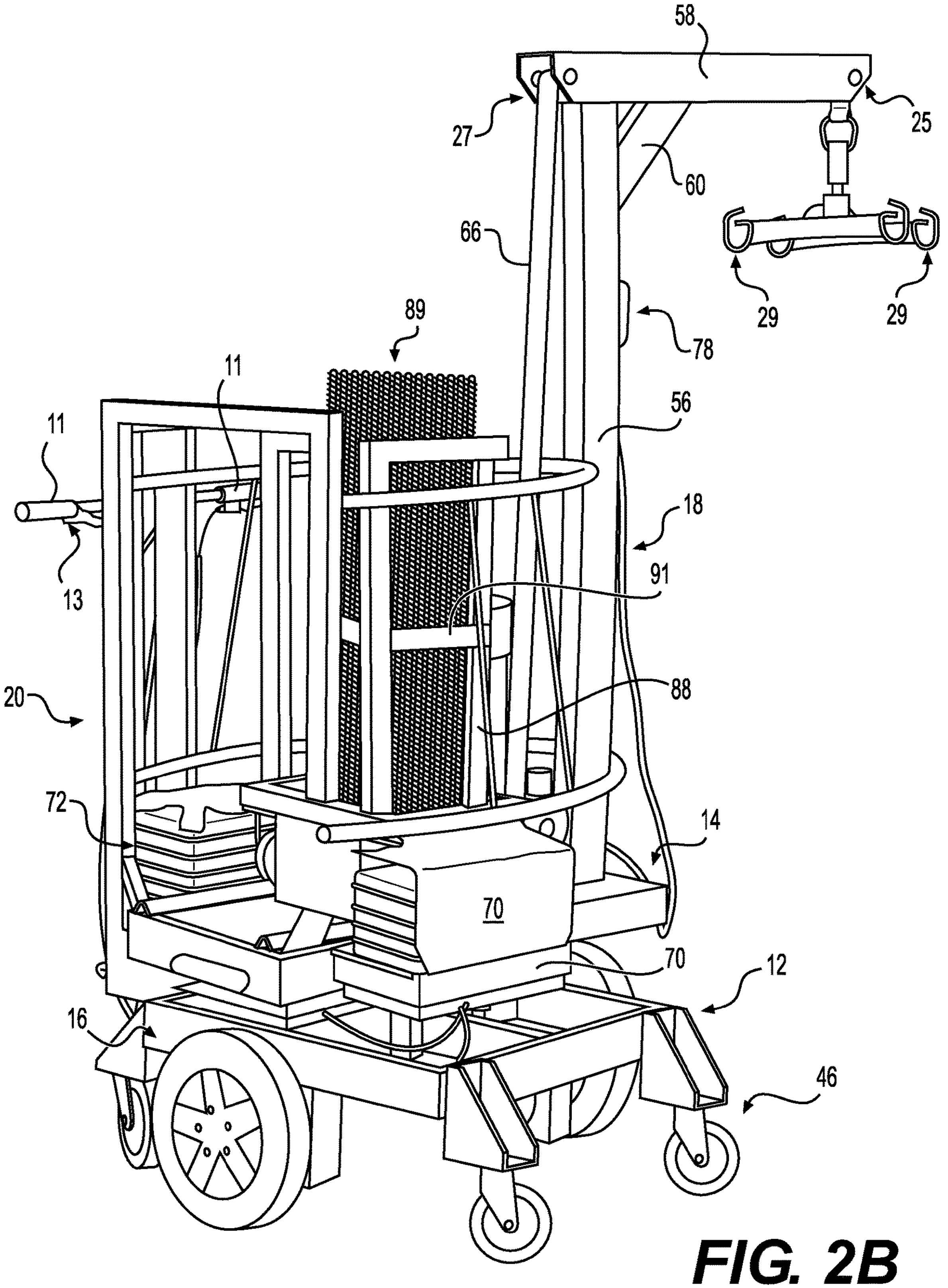
Figure 3:
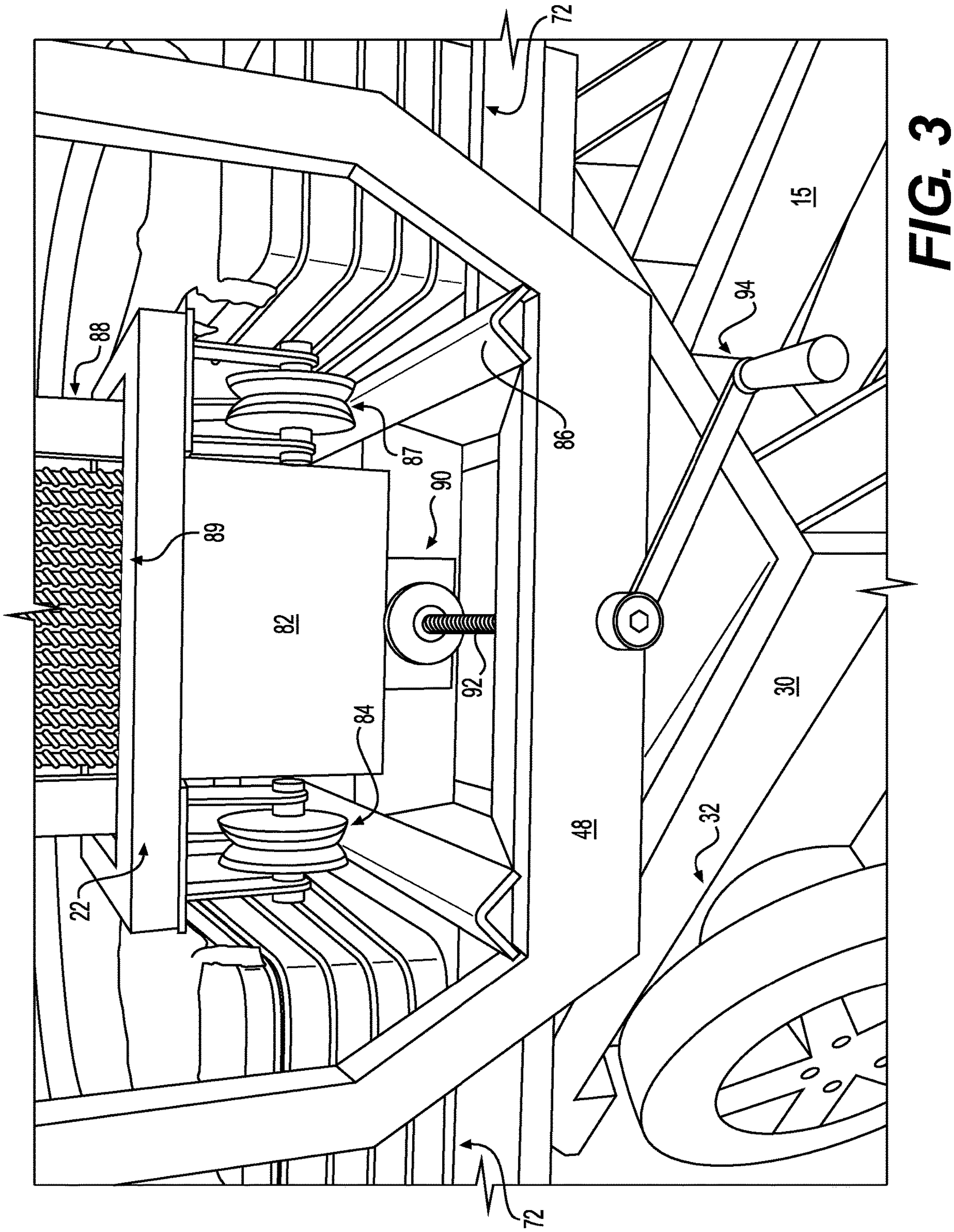
FIG. 3 is a rear perspective view of the counterweight assembly of the apparatus shown in FIGS. 1A and 1B.
Figure 6:
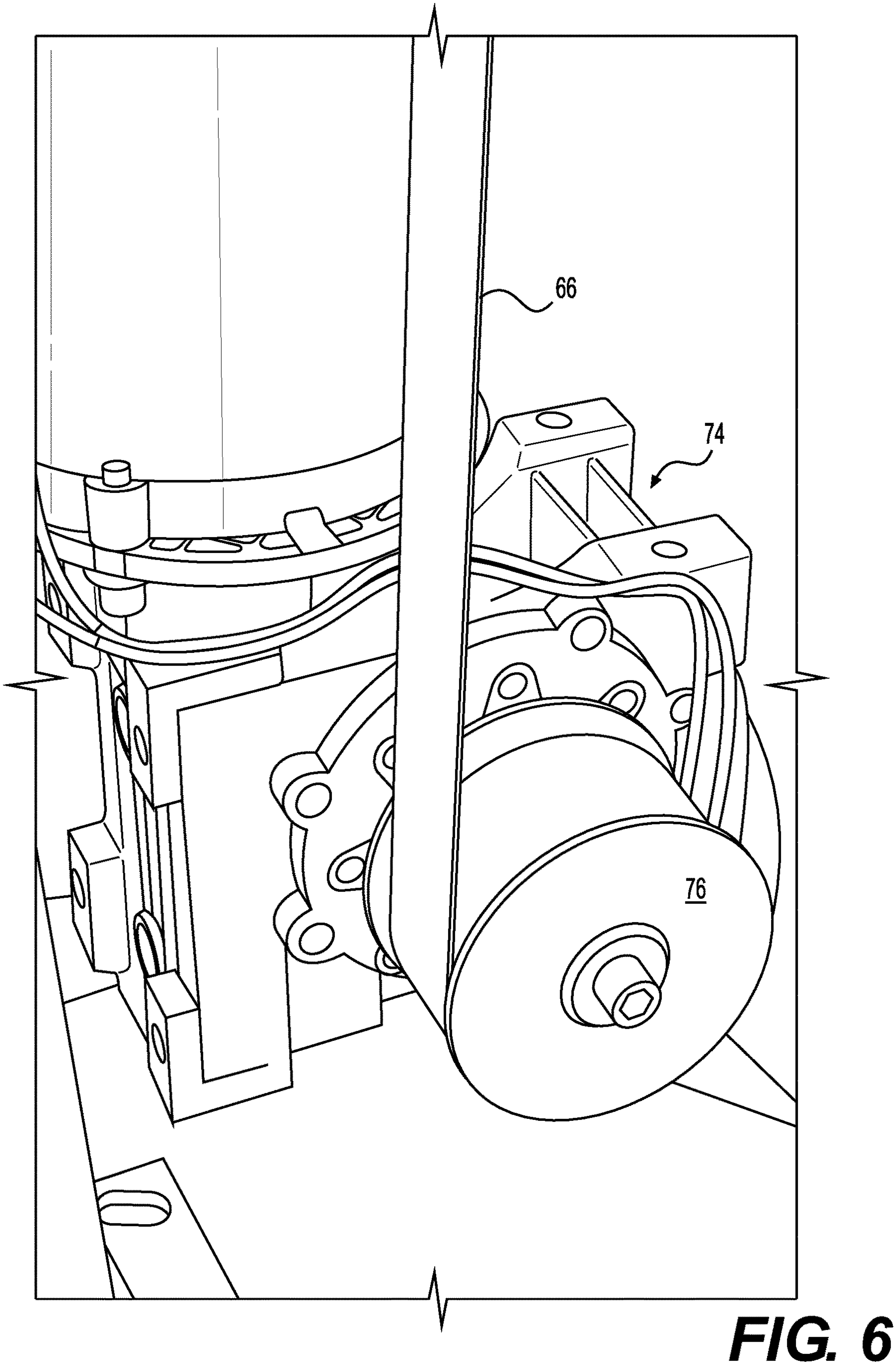
FIG. 6 is a perspective view of the lift motor and drum of the lifting assembly of the apparatus shown in FIGS. 1A and 1B.

Referring additionally to FIGS. 2A, 2B, and 6, the carriage assembly 14 can include a frame 44 with a platform defined by a front member 46, a rear member 48, and a pair of side members 50 that extend therebetween. The lift assembly 18 can extend upwardly from the front member 46 of the carriage assembly 14 and include a support arm 54, a lift motor 74, and a lift bar 62 that is operably secured to the lift motor 74 by an elongated flexible member 66, such as a strap or a belt. As shown, a horizontal member 58 can extend radially outwardly from the uppermost end of the vertical member 56, thereby forming a boom. The horizontal member 58 can be hollow and include a distal roller 25 at the distal end of the horizontal member 58 and a proximal roller 27 adjacent the top end of the vertical member 56. The distal roller 25 and the proximal roller 27 can be configured to direct and guide the elongated strap 66 of the lift assembly 18 through the horizontal member 58 from the lift bar 62 to the powered drum 76 of the lift motor 74. An angle brace 60 can extend between the horizontal members 58 and the vertical member 56 to lend rigidity to the support arm 54. A hand-held control 78 can be connected by wire to the lift motor 74 and allow the user to operate the lift motor 74 while maneuvering around the patient lift apparatus 10 as necessary when engaging a patient with the lift assembly 18. Typically, a flexible sling (not shown) is positioned beneath the patient, and the sling is then connected to hooks 29 on the lift bar 62 when moving a patient. The hand-held control 78 allows a user to rotate the powered drum 76 in both the clockwise and counter-clockwise directions by activating the lift motor 74 in the desired rotational direction. In some embodiments, the height of the vertical member 56 may be adjusted to allow for the use of the lift apparatus 10 in confined spaces where traditional lifts are not usable. For example, the vertical member 56 may include two telescoping portions that are adjustably secured to each other by a pin passing through a series of alignable apertures.

Figure 5:
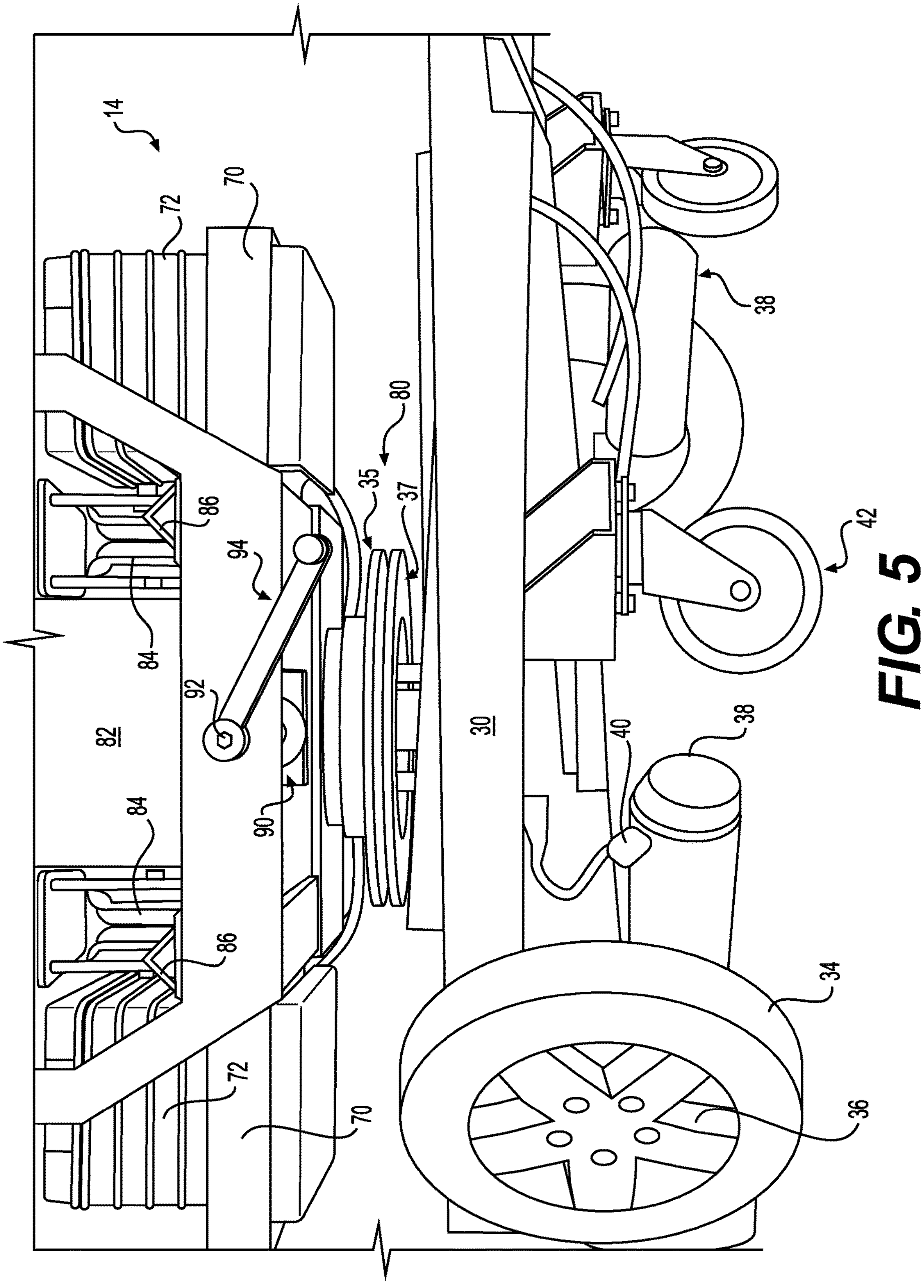
FIG. 5 is a partial side view of the apparatus showing the bearing assembly that rotatably secures the carriage assembly to the cart assembly of the apparatus.

A battery compartment 70 can be mounted on each side member 50 of the carriage assembly 14, with each battery compartment 70 being configured to hold one or more batteries 72 therein. The batteries 72 can provide electrical power to both the drive wheel assemblies 16 and the lift motor 74. As best seen in FIG. 5, the carriage assembly 14 can be rotationally mounted to the cart assembly 12 by a bearing assembly 80 disposed therebetween. As shown, the bearing assembly can include a top plate 35 that is affixed to the frame 44 of the carriage assembly 14, a bottom plate 37 that is affixed to the frame 24 of the cart assembly 12, and a plurality of rollers (not shown) positioned therebetween. The bearing assembly can allow for the reduced friction rotation of the carriage assembly 14 with regard to the cart assembly 12 in both the loaded and unloaded condition. Rotation of the carriage assembly 14 with regard to the cart assembly 12 allows a patient to be lifted by the support apparatus 18 from the front of the lift apparatus 10 or on either side without moving the entire apparatus to face the patient. Additionally, as best seen in FIG. 1B, a brake apparatus can be provided that non-rotatably locks the carriage assembly 14 to the card assembly 12. Specifically, the apparatus can include an elongated member 41 having a foot pedal 98 at the base of the handle assembly 20 and a locking mechanism (not shown) at the opposite end of the elongated member 41. The locking mechanism may include a pin that passes through aligned apertures in the top and bottom plates 35 and 37 of the bearing assembly 80, thereby preventing rotation of the carriage assembly 14 with regard to the cart assembly 12. In use, a user may disengage the pin of the apertures of the top and bottom plates 35 and 37 by pushing downwardly on the foot pedal 98, thereby allowing the carriage assembly 14 to be rotated freely with respect to the cart assembly 12.

Figure 4A:
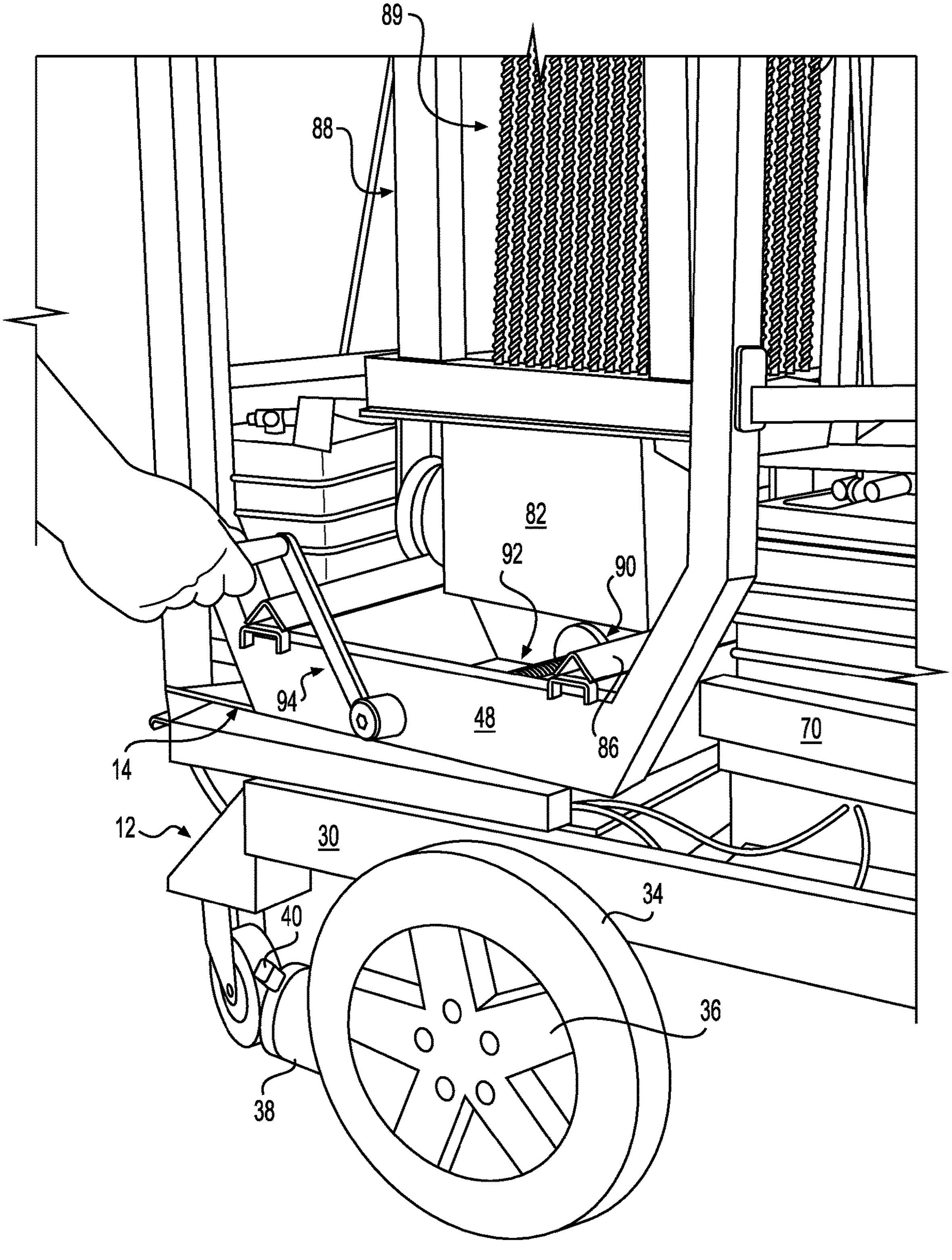
FIGS. 4A and 4B are rear perspective views of the counterweight assembly shown in FIG. 3 with the counterweight sled in a forward position and a rear position, respectively.
Figure 4B:
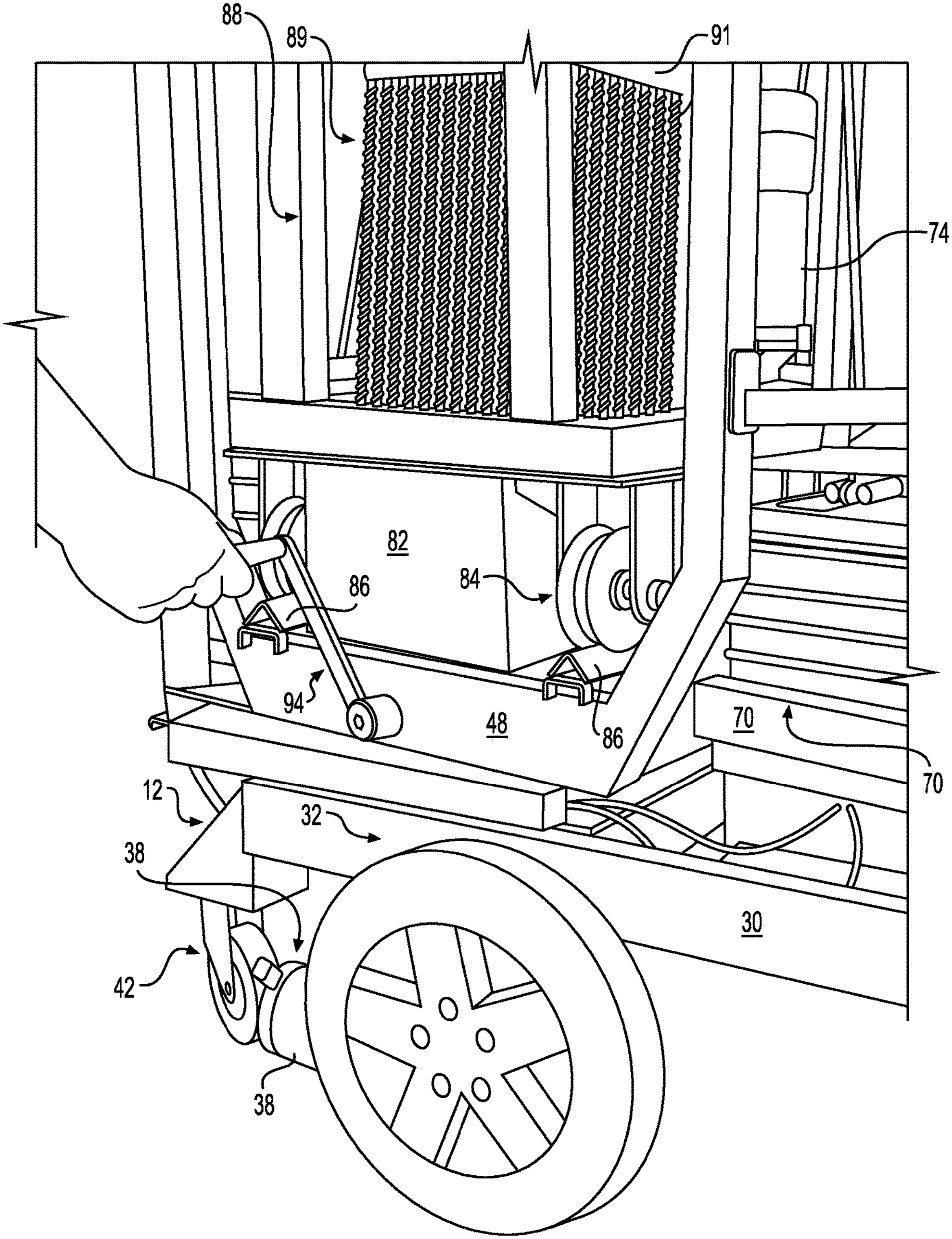

Referring now to FIGS. 4A and 4B, the counterweight assembly 22 of the patient lift apparatus 10 can be moveably mounted on the frame 44 of the carriage assembly 14 and configured to counter balance the weight of a patient being lifted by the lift assembly 18. Preferably, the counterweight assembly 22 includes a sled 82 that includes a plurality of rollers 84 mounted thereto, wherein the rollers 84 are configured to engage a pair of rails 86 that are affixed to the frame 44 of the carriage assembly 14. The longitudinal axes of the rails 86 can be parallel to a longitudinal center axis of the carriage assembly 14. As shown, each roller 84 can include an annular groove 87 that is correspondingly (e.g., complementarily) shaped and configured to receive the corresponding elongated rail 86 therein. A linear actuator 90 can include an elongated actuator screw 92 that is rotatably affixed to the frame 44 of the carriage assembly 14 and is parallel to the longitudinal axis thereof. One or more roller nuts (not shown) can be affixed to the sled 82 and configured to engage the elongated actuator screw 92 so that when the actuator screw 92 is rotated, the roller nuts and, therefore, the sled 82, axially move along the actuator screw 92. A basket 88 can extend upwardly from the top surface of the sled 82 and be configured to receive a plurality of counterweights 89 therein. As shown in the present example, the counterweights 89 can optionally comprise a plurality of elongated metal rods. As such, the counterweights 89 can be small enough in size that they may be moved on an individual basis by a user. This allows for an individual to increase the amount of counterweight as required by the weight of a potential patient. Additionally, counterweights 89 are easily removed for use elsewhere or merely to lighten the overall weight of the patient lift apparatus 10 (for example, when a large amount of weight is not needed or the apparatus 10 is not in use). Preferably, an adjustable strap 91 is used to secure the plurality of metal rods within the basket 88. It is contemplated that any manner or configuration of suitable counterweights, such as, but not limited to, blocks, plates, fluids, and the like may be used, although it is preferable to utilize counterweights that are in increments of weight that are readily handled by an individual (for example, increments ranging from 2.5 to 15 pounds or from 2.5 pounds to 5 pounds).

When the patient lift apparatus 10 is not being used to lift a patient, the sled 82 and, therefore, the plurality of counterweights 89 may be positioned in the forward-most position shown in FIG. 4A. When the sled is in the forward-most position, the counterweights 89 can be positioned over the drive wheel assemblies 16 and manipulation of the patient lift apparatus 10 is simplified. When it is desired to lift a patient on the lift apparatus 18, depending upon the weight of the patient to be supported, the user moves the sled 82 rearwardly with respect to the longitudinal center axis of the carriage assembly 14, meaning the counterweights 89 are moving farther away from the lift apparatus 18. As such, the lever arm length of the counterweights 89 is increased, meaning greater amounts of weight may be lifted by the lift assembly 18 while the stability of the patient lift apparatus 10 is maintained. In use, it is contemplated that the ability to increase the leverage arm of the counterweights 89 can allow for increased stability of the patient lift apparatus 10 although there are no extended support legs on the front end of the cart assembly 12 as is typically found in a traditional patient lift apparatus. When the sled 82 is in the rearward-most position shown in FIG. 4B, and yet even more counterweight is necessary, the user may simply add more of the individual metal rods to the basket 88. In alternate embodiments, it is contemplated that the adjustment of the counterweight sled 82 may be automated so as to occur without user input as the patient is being lifted on the lift assembly.

Figure 8:
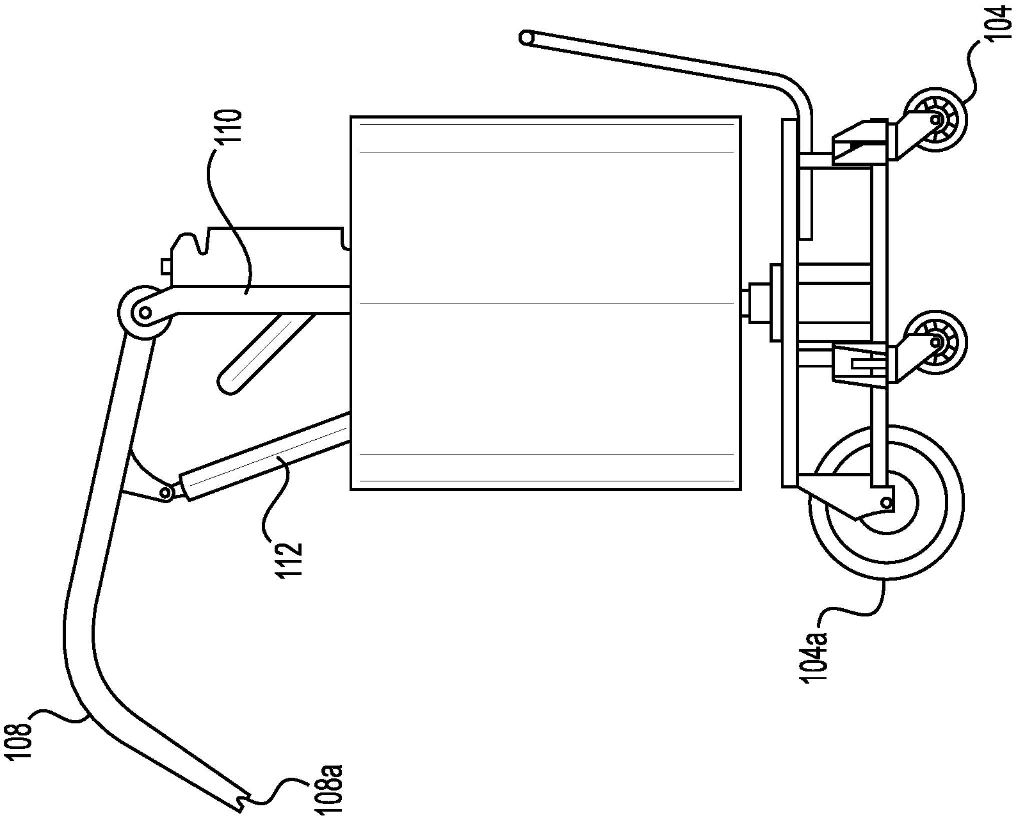
FIG. 8 is a side view of the apparatus shown in FIG. 7.
Figure 7:
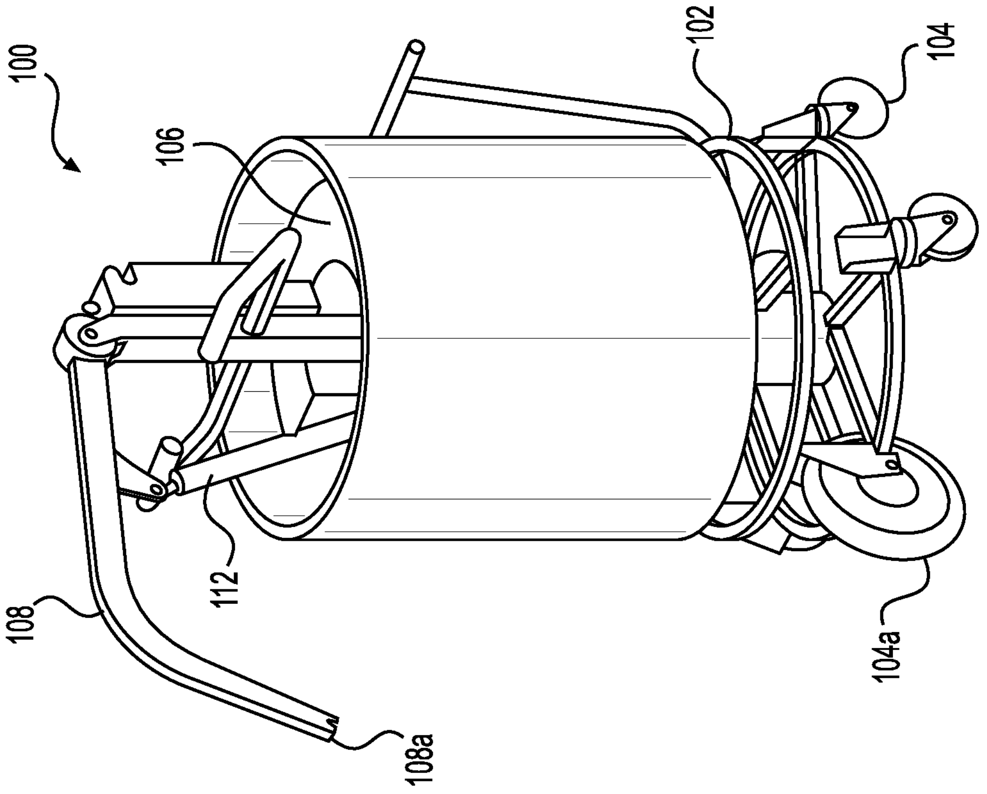
FIG. 7 is a perspective view of a portable apparatus for lifting and moving a patient in accordance with an alternate embodiment of the present disclosure.

Referring now to FIGS. 7 and 8, a portable patient lift apparatus 100 in accordance with an alternate embodiment of the invention is shown. The portable patient lift apparatus 100 can have a frame 102 and one or more wheels 104 that couple to the frame 102 and facilitate movement of the frame along a floor or other support surface. In some aspects, the wheels 104 can comprise one or a plurality of casters. In some aspects, the wheels 104 can comprise at least one wheel 104*a* that is not configured to swivel (e.g., a single front wheel 104*a*).

The portable patient lift apparatus 100 can comprise a counterbalance weight 106. The portable patient lift apparatus 100 may also comprise a boom 108. The boom 108 can extend from the frame 102 in a first direction, and the counterbalance weight 106 can have a center of mass offset from the boom 108 relative to the frame 102 in a second, opposite direction to act as a counterbalance to objects that are lifted by the boom 108 and supported thereon.

Optionally, the boom 108 can be pivotably coupled to a column 110. Pivoting the boom 108 upwardly can raise a distal end 108*a* of the boom 108 to lift a patient, and pivoting the boom 108 downwardly can lower the distal end 108*a* of the boom 108 to lower the patient. A piston 112 can facilitate pivotal movement of the boom 108. In some aspects, the piston 112 can be passive, applying an upward force to offset the weight of the patient. In other alternative aspects, the piston 112 can be an active piston that can be actuated (e.g., hydraulically or pneumatically) to pivot the boom 108.

In other aspects, the boom 108 can be fixedly coupled to the column. In some aspects, a tether (e.g., cable, strap, chain, or the like) be supported by a distal end 108*a* of the boom 108 (e.g., a pulley at the distal end of the boom). The tether (not shown) can be lowered or retracted (e.g., via a winch) to lift or lower the patient. For example, in some aspects, the portable patient lift apparatus 100 can comprise a spooled hoist style lift.

Preferably, the portable patient lift apparatus 100 does not comprise legs that extend forwardly therefrom. For example, in some aspects, the portable patient lift apparatus 100 does not comprise legs that extend forwardly of a distal end 108*a* of the boom 108. Thus, in some optional aspects, it is contemplated that, absent the counterbalance weight, the portable patient lift 100 would not be able to support the weight of a patient on the boom 108. In this way, the portable patient lift 100 can be positioned close to (or against) objects that commonly pose obstacles for current commercial powered patient lift legs such as platform bedframes, imaging tables, and the like.

Figure 10:
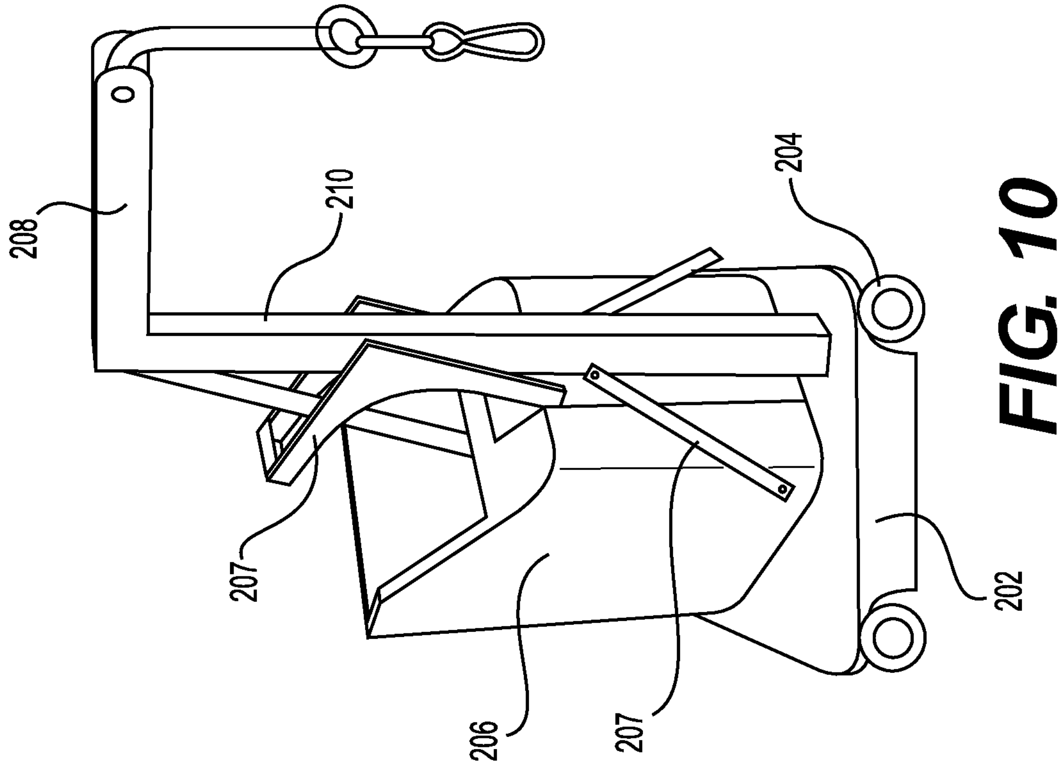
FIG. 10 is a perspective view of the apparatus shown in FIG. 9.
Figure 9:
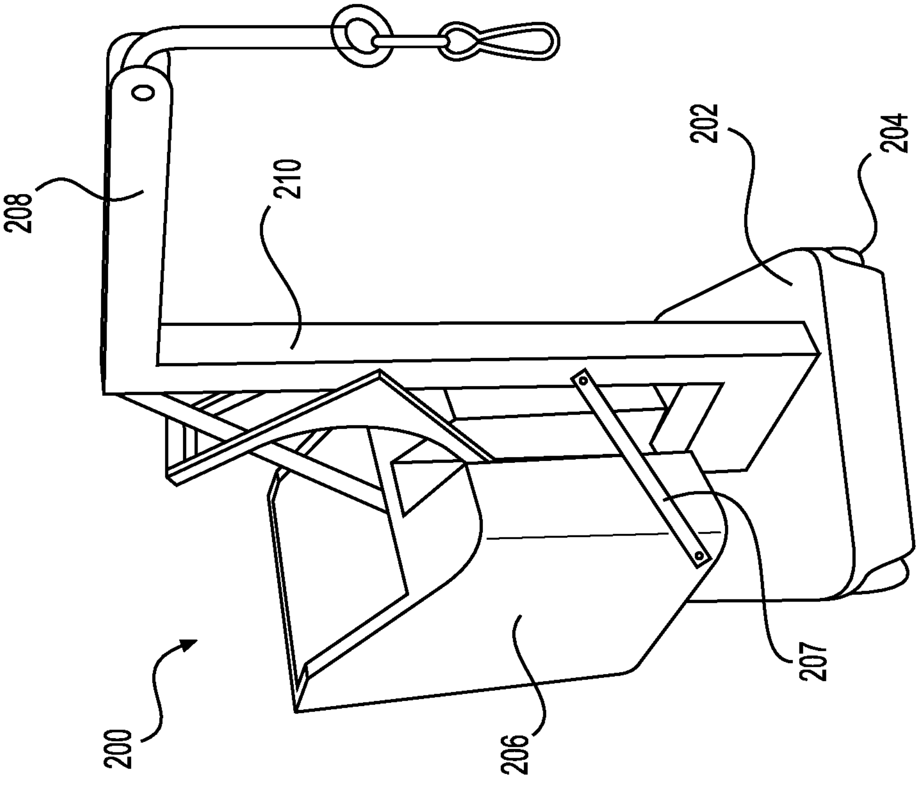
FIG. 9 is a perspective view of a portable apparatus for lifting and moving a patient in accordance with an alternate embodiment of the present disclosure.
Figure 12:
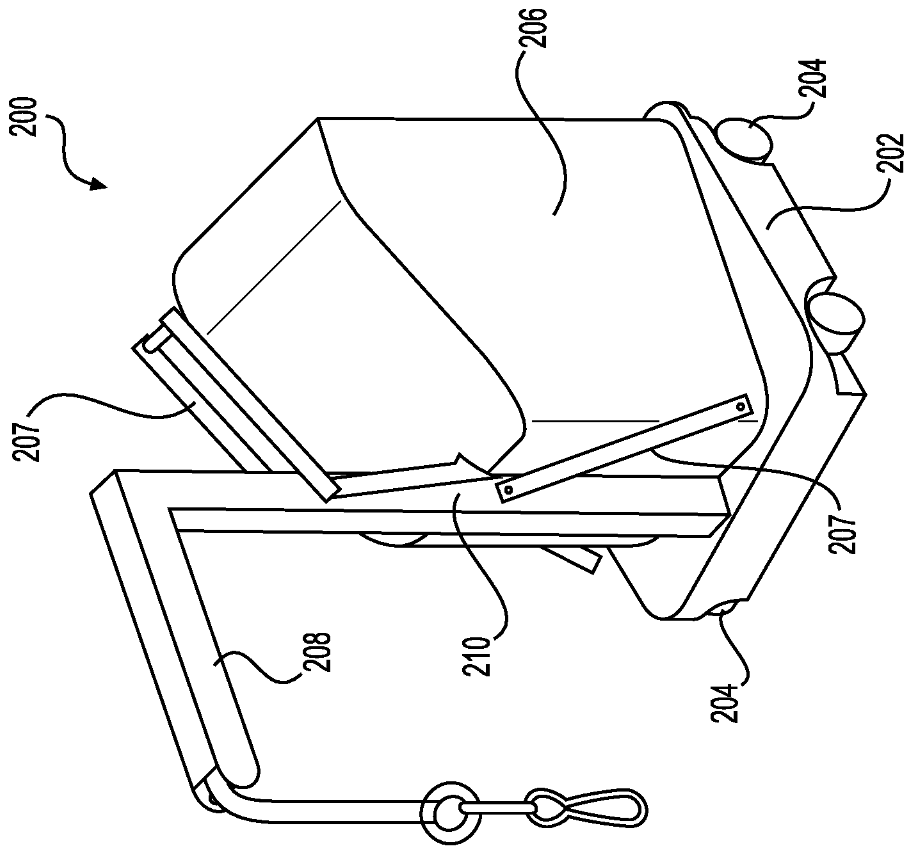
FIG. 12 is a perspective view of portable apparatus shown in patient in accordance with an alternate embodiment of the present disclosure.
Figure 11:
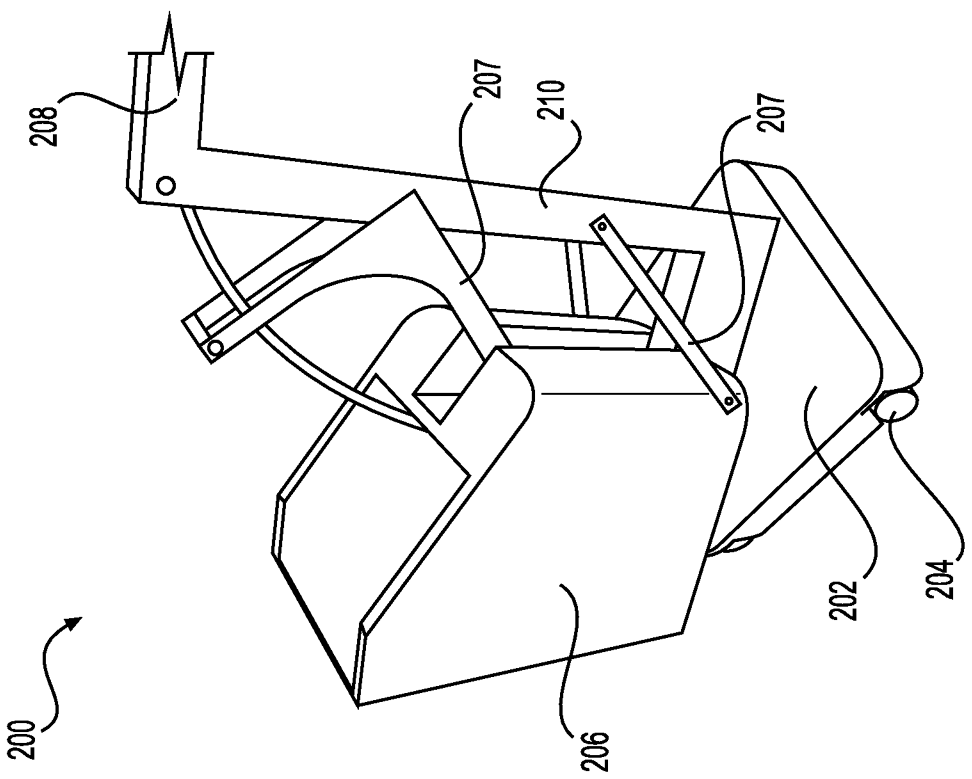
FIG. 11 is a perspective view of the apparatus shown in FIG. 9.

Referring now to FIGS. 9-11, in yet other alternate embodiments of the disclosed portable patient lift device 200 the counterbalance weight 206 can be movable both toward (FIG. 10) and away from (FIG. 9) the frame 202 (e.g., on an opposite side of the column 210) along a horizontal axis in order to balance weight supported on the boom 208 of the portable patient lift 200. For example, in some aspects, the counterbalance weight 206 can be coupled to the frame 202 by one or more arms 207 to permit the counterbalance weight to be pivoted outwardly. By using a movable counterbalance weight 206 rather than a stationary weight, a relatively lighter amount of weight can be used. The counterbalance weight 206 can be can moved outwardly from the lift column 210 proportionally to the patient weight. As such, an operator can manually position the patient throughout lifting and lowering, within a given range of motion envelope, with three degrees of freedom, as the patient weight is neutrally counterbalanced. The present embodiment may have a similar footprint to embodiments having a greater amount of counterweight, but do so while utilizing a significantly lower amount of counterweights.

In some optional aspects, the boom 208 can be configured to swivel relative to the frame 202. It is contemplated that the counterbalance weight 206 can swivel with the boom 208. In other aspects, the boom 208 can be fixed relative to the frame. It is contemplated that the wheels 204 and/or casters of the portable patient lift can permit swiveling of the frame 202.

Many interior infrastructures in buildings do not support, or cannot accommodate, ceiling lifts that typically would be used in certain environments. The disclosed portable patient lift assemblies can be advantageous for such environments. Additionally, it is contemplated that the ability to both lift and move the patient while lifted may be advantageous in many environments in which floor space is limited.

Although several embodiments of the invention have been disclosed in the foregoing specification and the following appendices, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed herein, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. An apparatus for lifting and moving a patient, the apparatus comprising: a cart assembly including a frame; a pair of wheel assemblies secured to the frame of the cart assembly; a carriage assembly including a frame, the carriage assembly being operably secured to the cart assembly; a lift assembly including a support arm with a proximal end secured to a front end of the frame of the carriage assembly; a patient support device operably secured to a distal end of the support arm; and a counterweight assembly including a plurality of counterweights supported on the carriage assembly, wherein the plurality of counterweights are selectively movable along a longitudinal axis of the carriage assembly, wherein the longitudinal axis of the carriage assembly extends parallel or substantially parallel to a horizontal surface, wherein the carriage assembly is rotatable with respect to the cart assembly.

2. The apparatus of claim 1, wherein the counterweight assembly further comprises: a sled on which the plurality of counterweights are disposed a plurality of rollers secured to the sled; and at least one elongated rail disposed on a top surface of the carriage assembly, wherein a longitudinal axis of each elongated rail of the at least one elongated rail is parallel to the longitudinal axis of the carriage assembly, and wherein each of the plurality of rollers is in rolling contact with a corresponding elongated rail of the at least one elongated rail.

3. The apparatus of claim 2, wherein the plurality of rollers comprises a first pair of rollers and a second pair of rollers, wherein the at least one elongated rail comprises a first elongated rail and a second elongated rail, and wherein the first pair of rollers is in rolling contact with the first elongated rail and the second pair of rollers is in rolling contact with the second elongated rail.

4. The apparatus of claim 2, wherein the counterweight assembly further comprises a linear actuator configured to move the plurality of counterweights fore and aft with respect to the longitudinal axis of the carriage assembly.

5. The apparatus of claim 4, wherein the linear actuator further comprises a lead screw assembly including a lead screw and a handle operably connected thereto, wherein rotation of the handle in a clockwise direction moves the sled in a first direction and rotation of the handle in a counter-clockwise direction moves the sled in a second direction that is opposite to the first direction.

6. The apparatus of claim 1, wherein the lift assembly further comprises a rotatable drum, an elongated flexible member having a proximal end operably secured to the rotatable drum, and a distal end secured to the patient support device, wherein rotation of the rotatable drum in a clockwise direction causes the elongated flexible member to be wound around the rotatable drum, thereby moving the patient support device vertically in a first direction, and wherein rotation of the rotatable drum in a counter-clockwise direction causes the elongated flexible member to be un-wound from the rotatable drum, moving the patient support device vertically in a second direction that is opposite the first vertical direction.

7. The apparatus of claim 6, wherein the lift assembly further comprises a lift motor that is operably secured to the rotatable drum and configured to selectively rotate the rotatable drum in the clockwise and the counter-clockwise directions, and wherein the elongated flexible member of the lift assembly comprises a flat strap.

8. The apparatus of claim 6, wherein a vertical height of the support arm is adjustable.

9. The apparatus of claim 1, further comprising a bearing assembly having a bottom plate secured to the cart assembly, a top plate secured to both the carriage assembly and the bottom plate, and a plurality of rollers disposed between the top plate and the bottom plate.

10. An apparatus for lifting and moving a patient, the apparatus comprising: a cart assembly including a frame; a pair of powered wheel assemblies secured to the frame of the cart assembly; a lift assembly including a support arm that is operably secured to the cart assembly; a patient support device operably secured to the support arm; and a counterweight assembly including a plurality of counterweights, wherein the plurality of counterweights are selectively movable along a longitudinal axis of the cart assembly, wherein the longitudinal axis of the cart assembly extends parallel or substantially parallel to a horizontal surface, wherein the counterweight assembly further comprises: a sled on which the plurality of counterweights is disposed; a plurality of rollers secured to the sled; and at least one elongated rail operably mounted to the cart assembly, and wherein each of the plurality of rollers is in rolling contact with a corresponding elongated rail of the at least one elongated rail.

11. The apparatus of claim 10, wherein the plurality of rollers comprises a first pair of rollers and a second pair of rollers, wherein the at least one elongated rail comprises a first elongated rail and a second elongated rail, and wherein the first pair of rollers is in rolling contact with the first elongated rail and the second pair of rollers is in rolling contact with the second elongated rail.

12. The apparatus of claim 10, wherein the counterweight assembly further comprises a linear actuator configured to move the plurality of counterweights with respect to the longitudinal axis.

13. The apparatus of claim 12, wherein the linear actuator further comprises a lead screw assembly including a lead screw and a handle operably connected thereto, wherein rotation of the handle in a clockwise direction moves the sled in a first direction, and wherein rotation of the handle in a counter-clockwise direction moves the sled in a second direction that is opposite to the first direction.

14. The apparatus of claim 10, wherein the lift assembly further comprises a rotatable drum, a lift motor that is operably secured to the drum and configured to selectively rotate the rotatable drum in a clockwise and a counter-clockwise direction, an elongated flexible member having a proximal end operably secured to the rotatable drum, and a distal end secured to the patient support device, wherein rotation of the rotatable drum in the clockwise direction causes the elongated flexible member to be wound around the rotatable drum, thereby moving the patient support device vertically in a first direction, and wherein rotation of the rotatable drum in the counter-clockwise direction causes the elongated flexible member to be un-wound from the rotatable drum, thereby moving the patient support device vertically in a second direction that is opposite the first vertical direction.

15. The apparatus of claim 10, wherein each powered wheel assembly of the pair of powered wheel assemblies is secured to a corresponding side of the frame of the cart assembly and includes a drive motor and a drive wheel operably secured thereto.

16. The apparatus of claim 10, further comprising a carriage assembly that is rotatably secured to the cart assembly, wherein the support arm of the lift assembly includes a proximal end that is secured directly to the carriage assembly, and wherein the plurality counterweights are movable axially in a direction that is parallel to a longitudinal axis of the carriage assembly.

17. An apparatus for lifting and moving a person, the apparatus comprising:

a cart assembly including a frame;

a plurality of wheels secured to the frame of the cart assembly;

a carriage assembly including a frame, the carriage assembly being operably secured to the cart assembly, the carriage assembly being rotatably mounted to the cart assembly such that the carriage assembly is rotatable about a vertical axis independently of the cart assembly, wherein the vertical axis is perpendicular or substantially perpendicular to a horizontal surface;

a lift assembly including a support arm with a proximal end secured to the frame of the carriage assembly; and a support device for the person operably secured to a distal end of the support arm.

18. The apparatus of claim 17, wherein at least one wheel of the plurality of wheels is a powered wheel.

19. The apparatus of claim 17 further comprising a counterweight assembly including one or more counterweights supported on the carriage assembly such that the one or more counterweights are configured to rotate with the carriage assembly about the vertical axis independently of the cart assembly.

* * * * *